United States Patent [19]

Bright et al.

[11] Patent Number: 5,783,049

[45] Date of Patent: Jul. 21, 1998

[54] METHOD OF MAKING ANTIREFLECTIVE COATINGS

[75] Inventors: Clark I. Bright, Half Moon Bay; F. Eugene Woodard, Los Altos; Steven J. Pace, San Mateo; Julius G. Kozak, Antioch, all of Calif.

[73] Assignee: Southwall Technologies Inc., Palo Alto, Calif.

[21] Appl. No.: 698,847

[22] Filed: Aug. 16, 1996

Related U.S. Application Data

[62] Division of Ser. No. 417,058, Apr. 3, 1995.

[51] Int. Cl.$^6$ .................................................. C23C 14/34
[52] U.S. Cl. ........................ 204/192.14; 204/192.26; 204/192.27; 204/192.3; 359/585; 359/586; 359/589; 428/216; 428/332; 428/336
[58] Field of Search ..................... 204/192.14, 192.26, 204/192.27, 192.3; 428/216, 332, 336; 359/586, 589, 585

[56] References Cited

U.S. PATENT DOCUMENTS

| | | | |
|---|---|---|---|
| 4,194,022 | 3/1980 | Gillery | 427/109 |
| 4,828,346 | 5/1989 | Jacobson et al. | 359/360 |
| 5,091,244 | 2/1992 | Biornard | 428/216 |
| 5,105,310 | 4/1992 | Dickey | 359/586 |
| 5,245,468 | 9/1993 | Demiryont et al. | 359/359 |
| 5,270,858 | 12/1993 | Dickey | 359/586 |
| 5,362,552 | 11/1994 | Austin | 428/216 |
| 5,372,874 | 12/1994 | Dickey et al. | 428/216 |
| 5,407,733 | 4/1995 | Bjornard et al. | 428/216 |
| 5,494,743 | 2/1996 | Woodard et al. | 428/336 |
| 5,579,162 | 11/1996 | Bjornard et al. | 359/580 |

*Primary Examiner*—Aaron Weisstuch
*Attorney, Agent, or Firm*—Burns, Doane, Swecker & Mathis LLP; Terry McHugh

[57] ABSTRACT

An improved way to impart antireflection properties to light transmissive substrates and, at the same time, achieve a durable surface and electrical conductivity is disclosed. A stack of at least two sputter-deposited light transmissive inorganic layers, one of which being electrically conductive and having a high index of refraction with the one above it (relative to the substrate being antireflected) having a low index of refraction, in combination with a thin lubricating overlayer comprising a solvent-soluble lubricant such as a solvent-soluble fluoropolymer can achieve this desired combination of properties.

8 Claims, 3 Drawing Sheets

METHOD OF MAKING ANTIREFLECTIVE COATINGS

This application is a divisional of application Ser. No. 08/417,058, filed Apr. 3, 1995.

BACKGROUND OF THE INVENTION

1. Field of the Invention

This invention relates to the treatment of light transmissive surfaces including inorganic surfaces and organic polymer surfaces with antireflective coatings. More specifically, this invention relates to a composite structure that includes a light transmissive substrate, such as an organic polymer substrate film, having on one or both of its surfaces a multilayer coating which is durable, which is electrically conductive and which reduces light reflection and increases light transmission.

2. Description of Prior Art

One method for reducing light reflection from a substrate (such as a polymer surface) is to coat the surface with an antireflective layer having a thickness of about a quarter wavelength. The antireflective layer may be an organic material such as a polymer or an inorganic material such as a metal fluoride, metal oxide, or metal nitride, where the deposited layer has a refractive index less than that of the substrate. A method for producing such a layer is disclosed in U.S. Pat. No. 4,066,814 to Chiklis. If the deposited antireflection layer is in contact with the air, the maximum reduction in reflection is achieved when the refractive index of the deposited antireflective layer equals the square root of the refractive index of the substrate. This approach has limitations. Single layer, low refractive index, antireflection coatings are relatively thick and can lead to distinct coloration to reflectance or transmission.

Antireflective coatings having wider bandwidths (and consequently less coloration) may also be obtained by using multiple deposited layers. As described in Optical Thin Films User's Handbook by James D. Rancourt, Macmillan Publishing Company, 1987, two common antireflective coating designs are the quarter-quarter and the quarter-half-quarter stacks. That is to say, the reflective coating is made up of a number of layers having differing refractive index materials, each equal in thickness to one-quarter or one-half of a wavelength sought to be antireflected. The applicability of these designs to magnetron-sputtering has tended to be restricted due to material availability and to manufacturing complexity.

Another way to decrease the reflection of a substrate surface is to include a porous coating. As taught in U.S. Pat. No. 4,282,643 to Yamasaki et al. porous coatings which result in a graded refractive index are particularly effective antireflective coatings. However, there are very few commercially viable processes for producing such coatings.

Yet another way to impart antireflection properties to a surface is disclosed in U.S. Pat. No. 5,494,743 to Woodard et al. A discontinuous layer or discontinuous double layer of certain metal oxides or oxynitrides is used to achieve an antireflection surface.

An additional issue arises when antireflective layers are employed. That is that the materials used in the antireflective coatings are selected for their optical properties (index, color, etc) and thus may be relatively fragile. If a conventional protective overcoating such as a thick hardcoat is applied over the antireflective layer, this hardcoating can itself present a reflective optical surface, thus negating the performance of the antireflective coating.

It is also known in the art that it is advantageous to have electrically conductive coatings on substrates in various applications and particularly in some setting where the conductive coating is substantially transparent. These conductive coatings can serve as static shields, as radiation shields and the like. These conductive coatings can find special application as transparent shields in front of or laminated to display faces such as CRT tubes.

It would be advantageous to achieve a simple-to-manufacture coating for light transmissive substrates which would incorporate these three properties of antireflectance, durability and electrical conductivity.

SUMMARY OF THE INVENTION

We have now discovered an improved way to impart antireflection properties to light transmissive substrates and, at the same time, achieve a durable surface and electrical conductivity. We have found that a stack of at least two sputter-deposited light transmissive inorganic layers, one of which being electrically conductive and having a high index of refraction (relative to the substrate being antireflected) with the one above it having a low index of refraction, in combination with a thin lubricating overlayer comprising a solvent-soluble lubricant such as a solvent-soluble fluoropolymer, can achieve this desired combination of properties.

This invention can take the form of a substrate carrying this simple three layer coating, (high and low inorganic layer plus lubricating layer) if desired. One can achieve broader bandwidth antireflection properties by employing a stack of two or more pairs of the alternating high and low index of refraction light-transmissive inorganic layers in place of the two layers in the simplest system. One can also apply this three or more layer-coating to both sides of a two-sided substrate.

In other more particular embodiments, we have found that this invention finds special application in the antireflection coating of plastic substrates, such as polyester (for example PET) substrates. We have also found that in preferred embodiments the use of two or three of these pairs of alternating index materials, with the first such pair, that is the pair closest to the substrate, being relatively thinner and the subsequent pairs being relatively thicker, gives good results. Substrates, and particularly plastic substrates, carrying these layers constitute one aspect of the invention. The process for preparing these materials using sputter-deposition constitutes another aspect of this invention.

Thus, in one embodiment this invention provides a light transmissive substrate having antireflection properties. This material has a light transmissive solid substrate presenting one or more surfaces sought to be antireflected. A multilayer antireflection coating is adhered to one or both of these surfaces and includes at least one pair of layers, each pair of which having, in order, a first layer, closest to the polymer substrate, of sputter-deposited, light transmissive, electrically conductive inorganic material having an index of refraction of from 1.7 to 2.6 and a thickness of from about 50 to 3000 angstroms, and a second layer of sputter-deposited light transmissive inorganic material having an index of refraction of from 1.29 to 1.7 and a thickness of from 50 to 3000 angstroms. The coating also includes a lubricating layer having a surface energy not greater than 40 dynes/cm on top of the multilayer inorganic antireflection coating stack. In variations on this embodiment, the antireflected substrate, particularly if is a polymer substrate, additionally may include a hardcoat layer on the substrate and between the substrate and the multilayer antireflection coating and/or a primer layer made up of an oxidizable metal under the multilayer antireflective coating. In a variation, the electrical conductivity can be imparted to this antireflection layer in the form of a separate conductive layer, typically made of a high refractive index material and of similar thickness to the first and second layers just recited.

Thus, in one preferred embodiment this invention provides a polymer having antireflection properties. This material has a solid polymer substrate presenting one or more surfaces sought to be antireflected. A multilayer antireflection coating is adhered to these surfaces and includes one and preferably two or more pairs of layers, each of which having, in order, a first layer, closest to the polymer substrate, of sputter-deposited light transmissive, electrically conductive inorganic material having an index of refraction of from 1.7 to 2.6 and a thickness of from about 50 to 3000 angstroms, and a second layer of sputter-deposited light transmissive inorganic material having an index of refraction of from 1.29 to 1.7 and a thickness of from 50 to 3000 angstroms, followed by a lubricating layer having a surface energy not greater than 40 dynes/cm on top of the multilayer antireflection coating. In variations on this embodiment, the antireflected polymer additionally comprises a hardcoat layer on the polymer substrate and between the substrate and the multilayer antireflection coating a hardcoat and/or a primer layer made up of an oxidizable metal under the multilayer antireflective coating.

In a more preferred embodiment this antireflected polymer product has a polyester substrate and one or more, but usually one, antireflective coatings with two pairs of layers, the first pair having, in order, a first layer, closest to the polyester substrate, of sputter-deposited, electrically conductive, light transmissive inorganic material having an index of refraction of from 1.88 to 2.15 and a thickness of from 150 to 500 angstroms, and a second layer of sputter-deposited, light-transmissive inorganic oxide having an index of refraction of from 1.4 to 1.6 and a thickness of from 150 to 500 angstroms, and the second pair having a first layer of sputter-deposited conductive transparent inorganic material having an index of refraction of from 1.88 to 2.15 and a thickness of from 500 to 1500 angstroms, and a second layer of sputter-deposited transparent inorganic oxide having an index of refraction of from 1.4 to 1.6 and a thickness of from 150 to 1500 angstroms, followed by the lubrication layer and, again, with or without the hardcoat and primer layers.

In another aspect this invention provides a process for imparting antireflection properties to a light transmissive substrate such as a polymer substrate. This process involves the serial steps of (a) sputter-depositing a first layer, closest to the substrate, of light transparent electronically conductive inorganic material having an index of refraction of from 1.7 to 2.6 and a thickness of from about 50 to 3000 angstroms, (b) sputter-depositing onto said first layer a second layer of transparent inorganic material having an index of refraction of from 1.29 to 1.7 and a thickness of from 50 to 3000 angstroms, (c) repeating steps (a) and (b) and thereafter applying a layer of solvent-soluble lubricant such as a soluble fluoropolymer to provide a surface energy not greater than 40 dynes/cm on top of the multilayer conductive inorganic antireflection coating stack.

In additionally preferred aspects, this process can include a preglow step preceding one or more of these sputter depositing steps and can include the application of a lubrication layer over the antireflection coating.

BRIEF DESCRIPTION OF THE DRAWINGS

This invention will be described with reference to the attached drawings. In these drawings.

DESCRIPTION OF PREFERRED EMBODIMENTS

Figure 1:
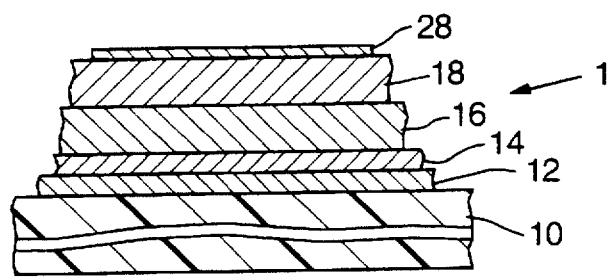
FIGS. 1 and 2 are schematic, not-to-scale cross-sectional views of plastic substrates carrying antireflective coatings of this invention.

The present invention provides an antireflection coating for substrates such as polymers. Turning to FIG. 1, an antireflection-coated product 1 of this invention is illustrated. Product 1 includes a substrate 10. The substrates which benefit from the antireflective coating and process of this invention can include light transmissive inorganic materials such as glass, quartz, magnesium fluoride, calcium fluoride, zinc selenide, various crystals and the like. More typically, however, the substrates are polymers, in particular carbon-based materials. They include classic organic polymers such as polyesters and polycarbonates and fluorocarbon and fluorohydrocarbon materials as well. These materials have indices of refraction of from about 1.2 to about 1.7 and especially about 1.4 to about 1.7. Representative organic polymers include polyesters such as poly (ethyleneterephthalate) ("PET"), polycarbonates, polyacrylates and methacrylates such as poly(methylmethacrylate) (PMMA), poly(methacrylate), poly(ethylacrylate) and copolymers such as poly(methylmethacrylate-co-ethylacrylate). Fluorocarbon polymers such as TEFLON, which is sold under a federally registered trademark of E.I. du Pont de Nemours and Company can be used as well. Other polymers which have indices of refraction below that of the antireflection coatings may be used, if desired. Although not a limitation to the application of this invention, clear, light-transmissive, plastic materials (i.e., plastic sheets, films, or bodies having integrated transmissions over the visual wavelengths of at least about 20%, i.e., from about 25% to about 90% without marked absorption or reflection peaks in this range) yield particularly attractive final products. The materials (without the antireflection coatings of this invention) commonly have from 5 to about 20% reflection over the visual wavelengths. For example, PET reflects 12–15% of the visible light (two sided reflection). Although not a requirement of the invention, this substrate may be colored or tinted. In some applications such coloring or tinting can offer advantages such as by improving display contrast or eliminating backlighting problems or the like.

The various inorganic and polymer substrates themselves are commercially available or can be prepared by various art-known processes. These substrates may be presented in any form which yields a surface in need of antireflection. Such surfaces can be provided by solid bodies, by sheet films such as plastic sheet films ranging in thickness from about 0.2 mil to about 50 mils or by plastic films applied or laminated onto nonpolymeric surfaces such as glass.

Substrate 10 carries an antireflective stack which includes a first pair of layers 12 and 14. Layer 12 is a sputter-deposited inorganic material having an index of refraction of from about 1.7 to about 2.6, and preferably 1.8 to 2.3 and especially 1.88 to 2.15. This layer is referred to as the "high index" layer of the pair.

This layer is characterized by being "substantially transparent" or "light transmissive". These terms are defined to mean that the material is substantially transmitting in the visible region (400–700 nm) with a total integrated absorption over this range of less than about 50% and preferably from 0% to 25% and more preferably from 0% to 20% at the layer thicknesses typically employed.

The materials used for layer 12 are often also substantially colorless when present in combination with the low index materials of layer 14. The term "substantially colorless" is defined to mean that the absorption curve for the material is devoid of significant absorption peaks in the 400–700 nm range and does not present a distinct tint or hue in reflected or transmitted light when viewed under typical sunlight conditions.

Layer 12 should have a substantial degree of electrical conductivity, that is, a sheet resistivity equal to or less than about $1 \times 10^6$ ohms per square, and particularly less than or equal to $1 \times 10^4$ ohms per square and most especially less than or equal to about $2-5 \times 10^3$ ohms per square. This can be achieved by making layer 12 from a metal oxide or sulfide that is oxygen or sulfur deficient and thereby inherently conductive. Examples of-such materials are oxides of tin, indium, zinc, tungsten, and cadmium and oxides of alloys of these materials such as indium-tin oxide, ZnO, $SnO_2$, $WO_2$, and the like. In addition, conductivity can be imparted to inorganic materials by doping them with metallic elements such as antimony, germanium, tin, aluminum, barium, boron, manganese, and the like. In this setting, indium/tin oxide mixtures give good results and are preferred.

Any inorganic material which can be laid down by sputter depositing, and that term is to be interpreted as including the direct laying down of the desired material and also the deposition of the materials by reactive sputtering processes, and which meets these optical parameters of refractive index and substantial transparency and electrical conductivity can be used. Examples of the classes of materials which fall within these parameters are metal oxides, nitrides, oxynitrides, carbides, sulfides and the like. Examples of metals which can form inorganic compounds meeting these criteria include transition metals such as indium, zinc, tin, titanium, tantalum, niobium, tungsten, vanadium, cerium, bismuth, and the like.

Examples of particular inorganic materials which can serve as this high index layer include $In_2O_3$, ZnS, ZnO, $SnO_2$, $TiO_2$, $Ta_2O_5$, $Nb_2O_5$, $WO_3$, $V_2O_5$, $CeO_2$, $Bi_2O_5$, SiN, SiCH and the like as well as mixtures of these types of materials, together with dopants, if needed to get to a conductive state.

Layer 12 ranges in thickness from about 50 to about 3000 angstroms and preferably from about 100 to about 1500 angstroms and more preferably from about 150 to about 350 angstroms.

Layer 14 also is a sputter-deposited inorganic material. It has an index of refraction of from about 1.25 to about 1.7, and preferably 1.29 to 1.6 and especially 1.4 to 1.6 . This layer 14 is referred to as the "low index" layer of the pair.

This layer 14, like layer 12, is characterized by being "substantially transparent". This material may also be "substantially colorless" when present in combination with the high index material of layer 12. Any inorganic material which can be laid down by sputter depositing and which meets these optical parameters of refractive index and substantial transparency can be used. Examples of the classes of compounds which have materials which fall within these parameters are certain inorganic oxides, metal fluorides, metal oxyfluorides and metal fluoronitrides.

Examples of particular inorganic materials which can serve as this low index layer 14 include $SiO_2$, cryolite, $MgF_2$, and $Al_2O_3$, and the like as well as mixtures of these types of materials.

Layer 14 is usually substantially the same thickness as layer 12 and thus ranges in thickness from about 50 to about 3000 angstroms and preferably from about 100 to about 1500 angstroms and more preferably from about 150 to about 350 angstroms.

The antireflection stack contains a lubricating layer 28. This layer is a thin layer, an average of 2 angstroms thick in some cases, and commonly lest than about 200 angstroms in thickness. (It will be appreciated that in the case of the lower end of these ranges the coating may in fact not be continuous but rather an average of covered and bare surfaces.) It is made up of a material having an inherent surface energy, as a bulk (continuous) coating, of less than 40 dynes/cm. This layer is present to improve the handleability and durability of the finished product. Lubricants used for this purpose may include, stearates, silanes or the like but are usually fluoro materials and more preferably are solvent-soluble fluoropolymers having an index of refraction of from about 1.29 to about 1.49. Typical thicknesses for the resulting layers are from about 2 angstroms to about 200 angstroms. These layers have the characteristic of lowering the surface energy of the coated polymer from about 60 dynes/cm to 40 or 30 or even below 20 dynes/cm. A preferred fluoropolymer lubricant layer is made from a material sold by 3M Company under the federally registered trademark FLUORAD fluorochemical coating type FC-722. This commercial material is delivered and soluble in fluorocarbon solvents and gives a surface with a bulk surface energy as low as 11–12 dynes/cm.

Product 1 may include at least two additional inorganic layers, shown as layers 16 and 18 in FIG. 1. Layer 16 is another high index layer and layer 18 is another low index layer. The materials presenting these layers are selected using the same optical criteria set forth for the selection of materials of layers 12 and 14, respectively. While the materials of these layers can be selected independently from those employed in layers 12 and 14, from a practical point of view there are manufacturing advantages to employing the same materials in layers 16 and 18 as are used in layers 12 and 14.

As shown in FIG. 1, it is often advantageous to have this second pair of layers thicker than the layers in the first pair. Again, the layers 16 and 18 are usually substantially similar in thickness to one another. Thus layers 16 and 18 range in thickness from about 50 to about 3000 angstroms and preferably from about 250 to about 2500 angstroms and more preferably from about 500 to about 1500 angstroms.

It will be appreciated that the structure depicted in FIG. 1 can be modified and adapted without departing from the spirit of this invention. For example, one could add a low index layer such as layer 14 under layer 12. Similarly, one could add a high index layer like layer 16 above layer 18. In another common variation one could employ more than two pairs of matched layers, for example using a stack which included in sequence three or more, for example three to five sequential pairs of layers. It is also possible to place an antireflective stack on more than one surface of a polymer body, for example on both sides of a plastic film. This is a real possibility with the present materials in light of their good durability which would allow the second coating to be carried out without damaging the first stack. One can also include additional layers in the antireflected polymer structure which are added to improve the durability, processibility and other characteristics of the final product.

Figure 2:
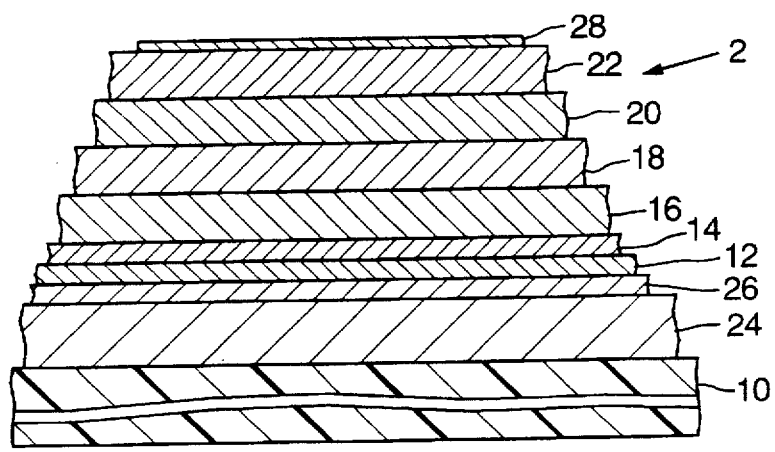

An example of such a more involved antireflectively coated polymer structure is depicted as 2 in FIG. 2. In antireflective polymer structure 2, substrate 10 and layers 12, 14, 16, and 18 and lubricating layer 28 are as previously described with reference to structure 1 in FIG. 1. Layers 20 and 22 are a third pair of high and low index of refraction layers which are selected in the same way that layers 16 and 18 were selected.

Structure 2 also includes a hardcoat layer 24 present on the plastic substrate 10. This hardcoat layer is present to improve the durability of the polymer substrate prior to and during processing. Hardcoat layers are known in the art and are commonly present on plastic film substrates as supplied commercially. The hardcoat material in layer 24 can be any of the known materials such as silica-based hardcoats, siloxane hardcoats, melamine hardcoats, acrylic hardcoats, and the like. These materials typically have refractive indexes of from about 1.40 to 1.65 and typically are from about 1 to about 20 um in thickness. These refractive indexes are lower than the index of the polymer itself. When a hardcoat is present it is often preferred to use at least two pairs of high and low index layers to achieve best antireflection performance.

The antireflection stack can be laid down directly onto the hardcoat layer 24, if desired. It is also advantageous to lay down a thin layer of a primer metal to improve adhesion and the like. The metal employed should be one which will undergo conversion (oxidation) in situ during processing to yield a substantially transparent, substantially colorless inorganic material such as a metal oxide. Examples of useful primer materials are Ti, Cr, Ni and alloys such as NiCr and the like. These materials undergo substantial degrees of oxidation in situ. This primer layer should be thin to minimize disruption of the desired optical properties of the antireflective polymer product. Thicknesses can range from 0 angstroms, in light of the optional nature of this layer, to as much as 50 angstroms with thicknesses of from about 0 to about 30 angstroms being preferred.

The antireflection coatings are prepared using sputtering. This process can be used to deposit metal layers which are subsequently converted to the transparent inorganic compounds used in the various layers. This might be done by laying the metal down from a metal cathode with a magnetron sputterer and an inert sputtering gas such as argon and then converting the laid down metal to the desired compound by reaction with oxygen, sulfur, nitrogen or the like, often in admixture with an inert sputtering gas, or a mixture of oxygen and nitrogen with inert gas and optionally hydrogen addition or the like. This approach can be used when laying down the primer layer 26, if desired. Alternatively, transparent inorganic compounds themselves can be sputtered. This is often a low efficiency process, however. Most commonly, the transparent inorganic materials are deposited by reactive sputtering in which the transparent inorganic materials are laid down by direct reactive sputtering in which the sputtering cathode is the metal and it is sputtered using reactive gas (oxygen, nitrogen, and hydrogen etc) and usually an inert sputtering gas such as argon to give the desired layer of compound. Dopants can be added by incorporating them into the sputtering target.

Thereafter, and optionally, the next transparent inorganic material is deposited, typically also by reactive sputtering, again with a suitable gas mixture. The thickness of the various layers is controlled by varying the voltage and current fed to the electrode targets, the gas flow rates and, in the case of continuous systems where the polymer substrate and sputtering target move relative to one another, the speed at which the substrate is moved past the target.

Very commonly, the laydown of the primer layer and the various transparent layers making up the antireflective coating is preceded by a mild preglow treatment. This can condition the surface for laydown and improve adhesion of the subsequently deposited layer.

Figure 3:
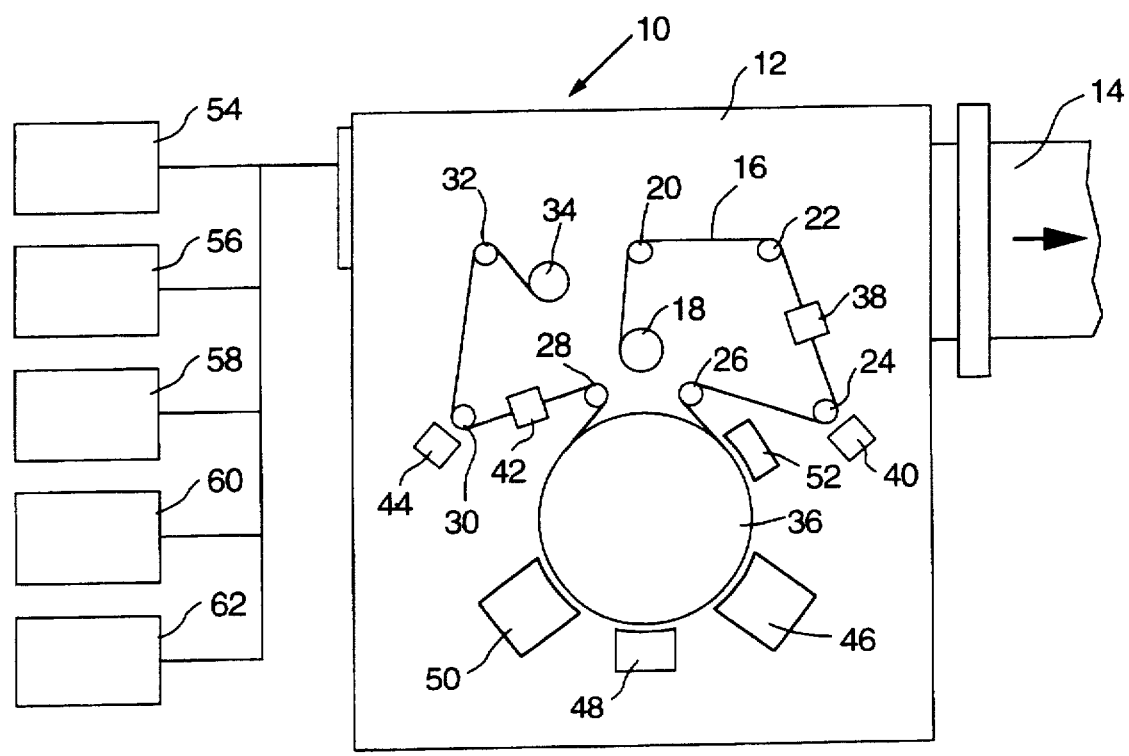
FIG. 3 is a schematic diagram of a magnetron sputtering unit useful for forming the antireflective coatings of this invention.

A sputter-deposition apparatus suitable for laying down these antireflection coatings is shown in FIG. 3. Sputter-depositing is a commercial process for depositing inorganic materials, metals, oxynitrides, oxides, and the like on surfaces. Representative descriptions of sputter-depositing processes and equipment may be found in U.S. Pat. Nos. 4,204,942 and to Chadroudi and 4,849,087 to Meyer, which are incorporated by reference.

In sputtering, a voltage is applied to a metal or metal compound sputtering cathode in the presence of a reactive or nonreactive gas to create a plasma. The action of the sputtering gas plasma on the cathode causes atoms of the cathode (target) to be dislodged and to travel and deposit upon a substrate positioned adjacent to the sputtering source. Typically the sputtering gas is a noble gas such as krypton or argon or the like. Argon is the most common sputtering gas because of its attractive cost. It is also known in the art to employ from about 1 to about 90% (or even 100% in the case of a titanium target) of one or more reactive gases as components of a sputtering gas mixture. When a reactive gas is present, it causes a metal to be deposited as an oxide (when an oxygen source is present), an oxynitride (when an oxygen and nitrogen source is present) and the like. This reactive sputtering process is well known and used commercially.

The materials of this invention may be prepared by a series of separate sputter-depositions. In this manner a polymer substrate would, for example, be exposed to a sputtering target under conditions set to yield the proper thickness of the first high index layer. Then the machine would be opened up, the target changed and conditions reset to deposit the first low index layer on the same substrate, now carrying the first high index layer. In a similar manner, the primer layer could be laid down and the surface could be subjected to preglow as desired. This sequential resetting of the machine and resputtering would be repeated until the desired stack is achieved. Alternatively, through the use of continuous feed sputtering equipment one could lay down more than one layer in a single pass.

FIG. 3 shows a continuous web coating sputtering machine. The web coating system is shown as System 10 in FIG. 3. System 10 includes vacuum chamber 12 which is evacuated via line 14. Contained within chamber 12 is a drive mechanism for moving a sheet of flexible polymer substrate 16 past a series of magnetron sputtering stations 50, 48, and 46. The drive mechanism includes feed roll 18, idlers 20, 22, 24, 26, 28, 30, and 32 and take-up roll 34. The film passes around chilled idler drum 36 as well. The film passes a pair of monitors for determining its transmittance, 38, and reflectance, 40, before coating and a similar pair of monitors 42 and 44 after coating. This coater is configured so as to be able to simultaneously and serially sputter deposit up to three layers on the web using three separate DC magnetron cathodes 46, 48, and 50. Typically, cathode 46 is used to lay down a metal or metal compound layer, such as the primer or the transparent nitride, oxynitride, oxide or the like used herein. Cathodes 48 and 50 can be used to lay down additional metal or metal compound layers such as the layers used in the present antireflection coatings. Also located in the system is a pre-glow station 52 for optional ionized gas cleaning or surface modifying of the substrate before coating. Similar processes are used for coating inflexible materials such as glass sheets or the like with the material handling being adapted to deal with the inflexibility.

Each of these four stations may be isolated from each other in space as a mini-chamber (See U.S. Pat. No. 4,298,444 to Chadroudi) thereby producing a local environment for the containment of the various plasma gasses. This allows separate processes to be carried out simultaneously at each station with variations in atmosphere from station to station but without cross-contamination among the four sources.

The control and monitoring of the sputtering system are normally accomplished using equipment and sensors which are standard in this coating machine. These are shown in FIG. 1 and include: 1) mass flow controllers (MKS) for regulation of gas flow into the cathode mini-chambers; 2) 5–10 kilowatt DC power supplies (Advanced Energy) for all three sputtering cathodes; 3) an optical monitoring system (Hexatron/Southwall Technologies) which measures both reflectance and transmission of the film over the spectral region from 400 to 2000 nm; and 4) a film motion control system (Drivex) which regulates the tension, speed, and distance of the film as it moves through the system.

The lubricating layer is added separately and not in connection with the sputtering apparatus. As already noted, these lubricating layers are generally quite thin. Such layers can be achieved by applying a layer of a dilute solution of the lubricating agent to the antireflected material and evaporating the solvent leaving a residue of the lubricant.

The antireflected materials of this invention find use in many applications. One application of special interest is as low reflectivity radiation shields for use in front of cathode ray tubes. The conductive layer provides a groundable transparent radiation shield. In this application the plastic film products can be applied to the outside of a glass CRT structure. They could be laminated onto a structure, as well.

This is but one of many uses for these products. They can be used as sheets of multipane window glazing units. Multipane window constructions and especially those having internal plastic film or internal glass surfaces are known in the art as shown in U.S. Pat. Nos. 3,935,351 to Franz; 4,335,166 to Lizardo et al; 4,853,264 to Vincent et al; and the like.

The invention will be further described by the following examples. These are presented to illustrate the invention and are not to be construed as a limitation of the invention defined by the claims.

EXAMPLES

Example 1

A roll of 0.007 inch thick, hardcoated PET film (Teijin) was loaded into a laboratory scale roll sputtering machine of the general type depicted in FIG. 3. The PET film had an index of 1.65. The hard-coat exhibited a 1.49 index. The film was oriented so that the hardcoat layer was facing the sputtering stations and passed through the machine five separate times.

Pass I

The first pass of the film through the machine was carried out under the following preglow conditions:

Glow only, no metal target
Gas Flow: $O_2$ 3.8 sccm
System Pressure: 13 μm
Glow Voltage: 1500 Volts
Glow Current Draw: 100 ma
Linespeed: 25 mm/sec Pass II The film was then rewound and then preglowed (as in Pass I) and immediately coated with the first high index layer in a second pass under the following conditions:

90:10 Indium/tin target
Gas Flow: $O_2$ 3.8 sccm, Ar 19.4 sccm
System Pressure: 3.65 μm
Target Power: 5000 Watts (DC)
Linespeed: 25 mm/sec
Nominal layer: 170 angstroms of indium/tin oxide Pass III The film was then rewound and then preglowed (as in Pass I) and immediately coated with the first low index layer under the following conditions:

Boron-doped silicon target
Gas Flow: $O_2$ 49.5 sccm, Ar 100 sccm
System Pressure: 3.57 μm
Target Power: 5000 Watts (AC)
Linespeed: 33 mm/sec
Nominal layer: 230 angstroms of boron-doped $SiO_2$ Pass IV The film was then rewound and then preglowed (as in Pass I) and immediately coated with the second high index layer under the following conditions:

90:10 Indium/tin target
Gas Flow: $O_2$ none added directly but excess from preglow available, Ar 19.4 sccm
System Pressure: 3.09 μm
Target Power: 3000 Watts (DC)
Linespeed: 6 mm/sec
Nominal layer: 900 angstroms of indium/tin oxide
Sheet Resistance: 190 ohms per square Pass V The film was then rewound and then preglowed (as in Pass I) and immediately coated with the second low index layer under the following conditions:

Boron-doped silicon target
Gas Flow: $O_2$ 48.8 sccm, Ar 90 sccm
System Pressure: 3.25 μm
Target Power: 5000 Watts (AC)
Linespeed: 8.4 mm/sec
Nominal layer: 810 angstroms of boron-doped $SiO_2$ Then, a thin layer (less than 100 angstroms) of lubricant (Flowrad FC-722) was deposited on the surface of the antireflective stack from a 0.005% solution in PF-5060 using a spin coating apparatus. (These two materials are available from 3M Corporation.)

Figure 4:
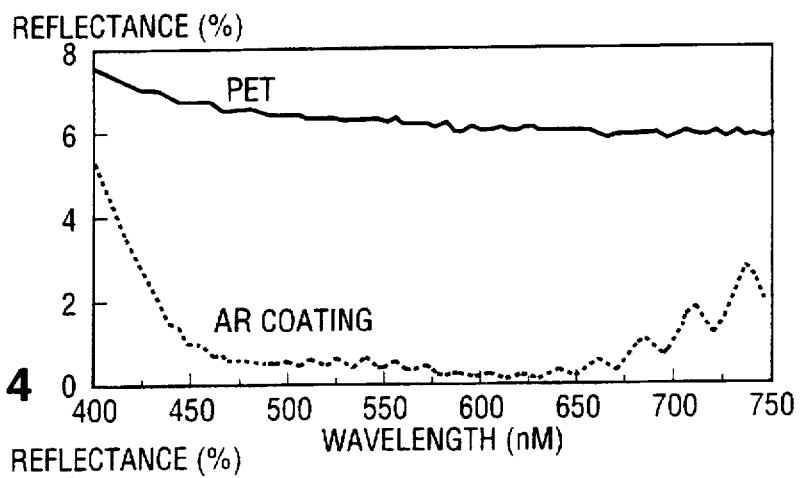
FIG. 4 is a diagram of the reflection decrease observed when a polymeric substrate (poly(ethyleneterphthalate)) is treated with an antireflective coating of this invention as set forth in Example 1.

This yielded a product having the antireflection properties shown in FIG. 4. The total visible reflection was 0.46% on one side (uncoated PET typically has a single side reflectivity of from 6–8%.) The material was colorless and transparent as shown by the spectrum in FIG. 4.

The antireflection coating was durable, as evidenced by its ability to withstand damage from scratching with a mechanical pencil at a tip loading of 200 grams. (A non lubricated equivalent material was damaged in the same test at a loading of 35 grams. The surface energy of the coated surface was reduced from 60 dynes/cm to less than 30 dynes/cm as a consequence of applying the fluoropolymer lubricant. The coating passed a cross-hatch adhesion test using 3M 610 adhesive tape. The coating had long term durability as shown by the fact that no imperfections were observed after the coating was subjected to 48 hours of 50° C. temperature at 98% relative humidity. The coating was electrically conductive with a sheet resistance of less than about 200 ohms per square.

An antireflection coating of this type has several important advantages. For one, it can be produced with as few as two inorganic materials, a high and a low index material plus the lubricating layer material. This leads to easy production and makes a two pass preparation particularly straightforward. For another, as just demonstrated, the coating is durable. It resists smudging, is readily cleaned and resists staining.

In the case of electrically conducting materials enhanced antistatic properties are possible by grounding the conductive layer. This also provides enhanced EMI shielding. The antistatic properties minimize dust collection and damage to sensitive electronic components. The conducting layers are close enough to the surface of the coating to allow good effective electrical connection to ground or other electrical connection.

The coatings offer an excellent balance of optical properties. They are extremely effective antireflective layers as demonstrated in the example. They provide very high visible transmittance (low absorbance) materials, unlike metallic antireflective coatings. This maximizes CRT brightness. In addition, the antireflection stack does permit a degree of UV transmission. This allows UV curing of a bonding adhesive if the coated film is being laminated onto another surface.

The coatings are relatively flexible, elastic and conforming. Depending upon the plastic substrate employed (such as the preferred PET materials) the coated product can be fitted and conformed over a wide rage of simple and complex surfaces.

Example 2

Figure 5:
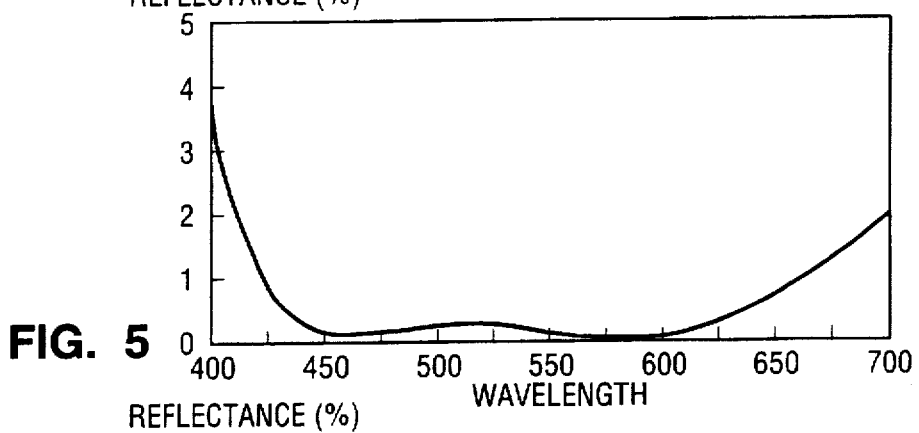
FIG. 5 is a diagram of the reflection achieved when hardcoated PET is treated as set forth in Example 2.

The preparation of Example 1 is repeated. The substrate is hardcoated PET. Five layers of inorganic transparent material are laid down. First is 321 Å of $SiO_2$, followed by 260 Å of ITO (conductive), followed by 263 Å of $SiO_2$, 637 Å ITO, 924 Å $SiO_2$. A lubricating layer is applied on top of this to yield a material which is electrically conductive, and durable, as shown by a computer-generated plot given in FIG. 5.

Example 3

Figure 6:
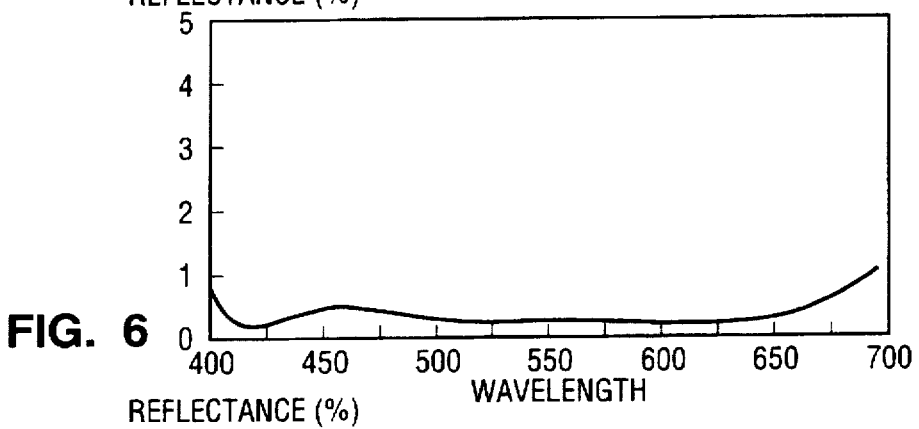
FIG. 6 is a diagram of the reflection achieved when PET is treated as set forth in Example 3.

The preparation of Example 1 is repeated. The substrate is PET, this time without a hardcoat. Seven layers of inorganic transparent material are laid down. The first is 560 Å of $SiO_2$, followed by 72 Å of ITO (conductive), followed by 943 Å of $SiO_2$, 298 Å ITO, 205 Å $SiO_2$, 702 Å ITO, 902 Å $S_iO_2$. A lubricating layer is applied on top of this to yield a material which is electrically conductive and durable, as shown by a computer-generated plot given in FIG. 6. This is a "quarter-quarter-quarter" system.

Example 4

Figure 7:
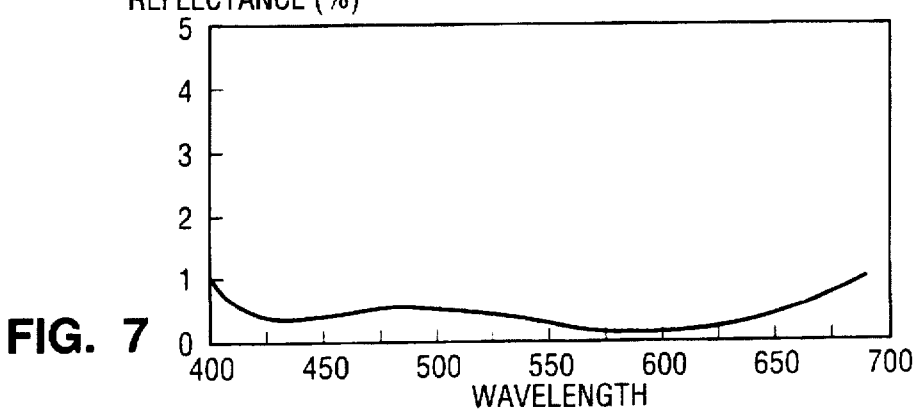
FIG. 7 is a diagram of the reflection achieved when PET is treated as set forth in Example 4.

The preparation of Example 1 is repeated. The substrate is PET, this time without a hard coat. Six layers of inorganic transparent material are laid down. The first is 112 Å of ITO (conductive), followed by 323 Å of 363 Å ITO, 76 Å $S_iO_2$, 888 Å ITO, 869 Å. A lubricating layer is applied on top of this to yield a material which is electrically conductive and durable, as shown by a computer-generated plot given in FIG. 7. This is a "quarter-quarter-quarter-quarter" system.

Example 5

Figure 8:
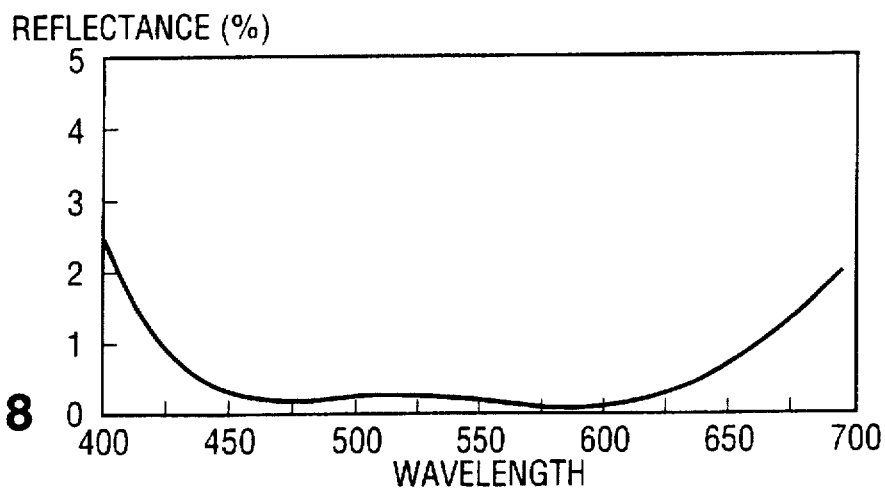
FIG. 8 is a diagram of the reflection achieved when hardcoated PET is treated as set forth in Example 5.

The preparation of Example 1 is repeated. The substrate is hardcoated PET. Five layers of inorganic transparent material are laid down. First is 1477 Å of $SiO_2$, followed by 193 Å of ITO (conductive), followed by 223 Å of $SiO_2$, 853 Å ITO, 850 Å $SiO_2$. A lubricating layer is applied on top of this to yield a material which is electrically conductive and durable, as shown by a computer-generated plot given in FIG. 8. This is a "quarter-quarter-quarter-quarter" system.

Example 6

Figure 9:
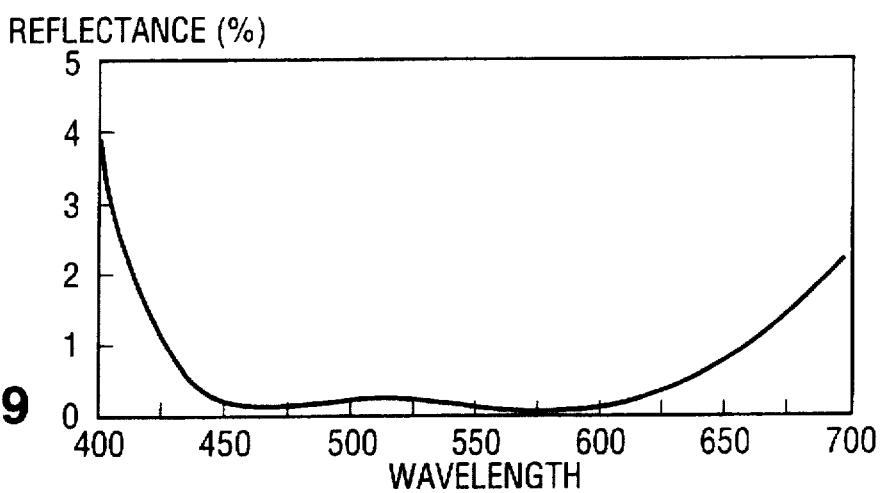
FIG. 9 is a diagram of the reflection achieved when hardcoated PET is treated as set forth in Example 6.

The preparation of Example 1 is repeated. The substrate is hardcoated PET. Five layers of inorganic transparent material are laid down. First is 1327 Å of $SiO_2$, followed by 231 Å of ITO (conductive), followed by 277 Å of $SiO_2$, 633 Å ITO, 917 Å $SiO_2$. A lubricating layer is applied on top of this to yield a material which is electrically conductive, and durable, as shown by a computer-generated plot given in FIG. 9. This is a "half-quarter-quarter-quarter" system.

Example 7

Figure 10:
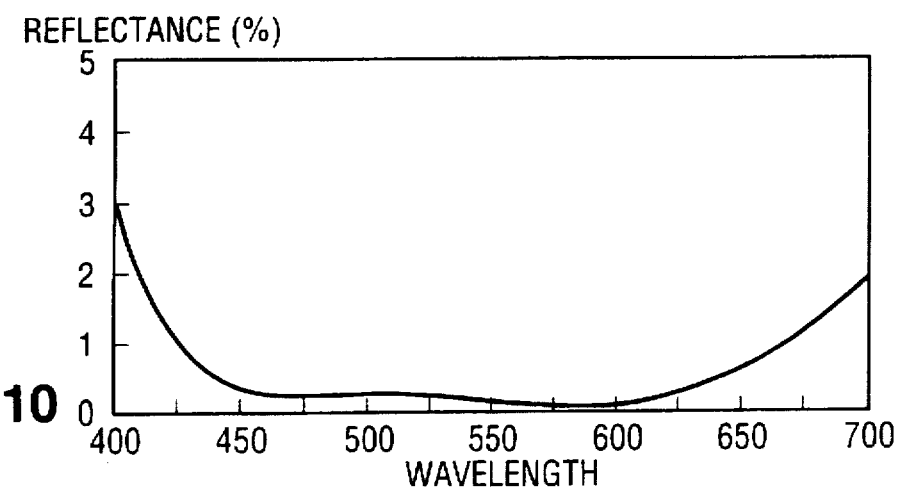
FIG. 10 is a diagram of the reflection achieved when glass is treated as set forth in Example 7.

The preparation of Example 1 is repeated. The substrate is glass having a refractive index of 1.52. Four layers of inorganic transparent material are laid down. First is 218 Å of ITO (conductive), followed by 200 Å of $SiO_2$, 848 Å ITO, 873 Å $S_iO_2$. A lubricating layer is applied on top of this to yield a material which is electrically conductive, and durable, as shown by a computer-generated plot given in FIG. 10.

What is claimed is:

1. A process for imparting antireflection properties to a polymer substrate, comprising the serial steps of:
   (a) sputter-depositing a first layer, closest to the polymer substrate, of light transparent electrically conductive inorganic oxide having an index of refraction of from 1.7 to 2.6 with respect to visible light and a physical thickness of from about 50 to 3000 angstroms,
   (b) AC sputter-depositing onto said first layer a second layer of light transparent inorganic material having an index of refraction of from 1.29 to 1.7 with respect to visible light and a physical thickness of from 50 to 3000 angstroms, thereby forming a layer pair, and
   (c) applying a lubricating layer onto the layer pair.

2. The process of claim 1 additionally comprising the serial step of
   (c) repeating steps (a) and (b).

3. The process of claim 2 additionally comprising the serial step of:
   (d) repeating steps (a) and (b) following step (c).

4. The process of claim 1 additionally comprising the pretreatment step, prior to step (a) of (a') subjecting the polymer substrate to a preglow treatment.

5. The process of claim 2 wherein the substrate is a flexible web of poly(ethylenetherphthalate).

6. The process of claim 1 further comprising a step of forming a hardcoat layer on said substrate prior to step (a).

7. A process for imparting antireflection properties to a flexible web of hardcoat-surfaced poly(ethyleneterephthalate) substrate, comprising the serial steps of:

(a) subjecting the hardcoat surface of the flexible web of a poly(ethyleneterephthalate) substrate to a preglow treatment to yield a preglowed substrate, (b) sputter-depositing onto said hardcoat surface of said preglowed substrate a first layer, closest to the substrate, of electrically conductive light transparent inorganic oxide having an index of refraction of from 1.88 to 2.15 with regard to visible light and a physical thickness of from 150 to 500 angstroms, (c) AC sputter-depositing onto said first layer a second layer of light transparent inorganic material having an index of refraction of from 1.4 to 1.6 with regard to visible light and a physical thickness of from 150 to 500 angstroms, (d) sputter-depositing onto said second layer a third layer of electrically conductive light transparent inorganic oxide having an index of refraction of from 1.88 to 2.15 with regard to visible light and a physical thickness of from 500 to 1500 angstroms, (e) AC sputter-depositing onto said third layer a fourth layer of light transparent inorganic material having an index of refraction of from 1.4 to 1.6 with regard to visible light and a physical thickness of from 500 to 1500 angstroms, and (f) applying onto said fourth layer a lubricating layer having a surface energy not greater than 40 dynes/cm.

8. A process for imparting antireflection properties to a flexible web of hardcoat-surfaced polymer substrate, comprising the serial steps of:

(a) subjecting the hardcoat surface of the flexible web of a polymer substrate to a preglow treatment to yield a preglowed substrate, (b) sputter-depositing onto said hardcoat surface of said preglowed substrate a first layer, closest to the substrate, of light transparent inorganic oxide having an index of refraction of from 1.88 to 2.15 with regard to visible light and a physical thickness of from 150 to 500 angstroms, (c) AC sputter-depositing onto said first layer a second layer of light transparent inorganic material having an index of refraction of from 1.4 to 1.6 with regard to visible light and a physical thickness of from 150 to 500 angstroms, (d) sputter-depositing onto said second layer a third layer of electrically conductive light transparent inorganic oxide having an index of refraction of from 1.88 to 2.15 with regard to visible light and a physical thickness of from 500 to 1500 angstroms, (e) AC sputter-depositing onto said third layer a fourth layer of light transparent inorganic material having an index of refraction of from 1.4 to 1.6 with regard to visible light and a physical thickness of from 500 to 1500 angstroms, and (f) applying onto said fourth layer a lubricating layer having a surface energy not greater than 40 dynes/cm.

* * * * *